United States Patent [19]

Misawa

[11] Patent Number: 5,294,952
[45] Date of Patent: Mar. 15, 1994

[54] APPARATUS FOR DRIVING MIRROR OF CAMERA

[75] Inventor: Masayuki Misawa, Tokyo, Japan

[73] Assignee: Asahi Kogaku Kogyo Kabushiki Kaisha, Tokyo, Japan

[21] Appl. No.: 939,155

[22] Filed: Sep. 2, 1992

[30] Foreign Application Priority Data

Sep. 9, 1991 [JP] Japan ................. 3-95965[U]

[51] Int. Cl.⁵ .................................. G03B 19/12
[52] U.S. Cl. ............................. 354/152; 354/153
[58] Field of Search .................. 354/152, 153, 156

[56] References Cited

U.S. PATENT DOCUMENTS

| | | | |
|---|---|---|---|
| 3,568,585 | 3/1971 | Ishizaka | 354/156 |
| 3,882,523 | 5/1975 | Uno et al. | 354/152 |
| 3,967,298 | 6/1976 | Adamski | 354/153 |
| 4,003,066 | 1/1977 | Shono | 354/156 |
| 4,192,598 | 3/1980 | Sato et al. | 354/153 |
| 4,264,170 | 4/1981 | Kurei | 354/152 |
| 4,327,982 | 5/1982 | Yamamichi et al. | 354/156 |
| 4,348,088 | 9/1982 | Yamamichi et al. | 354/152 |
| 4,385,820 | 5/1983 | Shono | 354/152 |
| 4,469,420 | 9/1984 | Uematsu | 354/153 |
| 4,529,284 | 7/1985 | Hiramatsu et al. | 354/234.1 |
| 4,668,066 | 5/1987 | Ohnuki | 354/152 |
| 4,730,200 | 3/1988 | Kitazawa | 354/152 |

FOREIGN PATENT DOCUMENTS 2350733 4/1975 Fed. Rep. of Germany .

Primary Examiner—Michael L. Gellner
Assistant Examiner—Eddie C. Lee
Attorney, Agent, or Firm—Sandler Greenblum & Bernstein

[57] ABSTRACT

A mirror driving apparatus for a camera which rotatably drives a mirror between two predetermined position, by an elastic restoring force stored in a mirror biasing member, including an engaging device which retains an elastic restoring force in the mirror biasing member, and a disengaging and shock absorbing spring which elastically biases the engaging device in a disengaging direction thereof when the mirror is in one of the predetermined position. The disengaging and shock absorbing spring biases the mirror in a direction to stop the same immediately before the movement of the mirror is completed when the mirror is moved to the other of the predetermined position by the elastic restoring force of the mirror biasing member.

15 Claims, 3 Drawing Sheets

APPARATUS FOR DRIVING MIRROR OF CAMERA

BACKGROUND OF THE INVENTION

1. Field of the Invention

The present invention relates to an apparatus for driving a mirror in a camera, such as a single lens reflex camera.

2. Description of Related Art

A known single lens reflex camera is provided with a quick-return mirror in a mirror box of a camera body. The quick-return mirror is moved between a viewing position and a photographing position by a driving mechanism. The driving mechanism is constituted, for example, by a motor which moves the quick-return mirror upwardly, from the viewing position, toward the photographic position in which a picture can be taken. Alternatively, it is also known to provide an elastic biasing mechanism, such as a coil spring, which continuously biases the quick-return mirror toward the photographic position. With such a mechanism, the quick-return mirror is moved upwardly to the photographic position when the elastic restoring force is released. In such a known mirror driving means, the upward movement of the quick-return mirror is suddenly stopped at the photographic position. Accordingly, it is necessary to provide a shock absorbing mechanism, such as an elastic damper or a governor, to absorb the oscillation or vibration that occurs when the mirror is brought to a sudden stop. This prevents the associated elements from being deformed or broken. If a motor is used as the driving mechanism, a braking mechanism is necessary to brake the motor. However, conventional measures to absorb shock or oscillation, or to brake the motor are complex.

SUMMARY OF THE INVENTION

The primary object of the present invention is to provide a mirror driving apparatus of a camera in which shock, oscillation, or vibration of the quick-return mirror that occurs when the upward movement of the quick-return mirror is brought to a halt, can be effectively dampened or absorbed by a simple mechanism.

To achieve the object mentioned above, according to the present invention, there is provided a mirror driving apparatus for a camera which drives a mirror, and is rotatably movable between two predetermined positions, by an elastic restoring force stored in a mirror biasing member. The mirror driving apparatus comprises an engaging mechanism for retaining the elastic restoring force in the mirror biasing member, and a disengaging and shock absorbing mechanism for elastically biasing the engaging mechanism in a disengaging direction thereof when the mirror is in one of the predetermined positions, and for biasing the mirror in a direction to stop the same immediately before the movement of the mirror is completed, when the mirror is moved to the other of the predetermined positions by the elastic restoring force of the mirror biasing member.

With this structure, since the disengaging and shock absorbing means for elastically biasing the mirror engaging mechanism in the disengaging direction acts on the mirror before the movement of the mirror is completed, the mirror is biased in the stop direction thereby decelerating the mirror. Thus, the shock which would occur when the mirror is brought to a stop is absorbed or dampened.

The present disclosure relates to subject matter contained in Japanese utility model application No. 03-95965 (filed on Sep. 9, 1991) which is expressly incorporated herein by reference in its entirety.

BRIEF DESCRIPTION OF THE DRAWINGS

The invention will be described below in detail with reference to the accompanying drawings, in which.

DESCRIPTION OF THE PREFERRED EMBODIMENT

Figure 1:
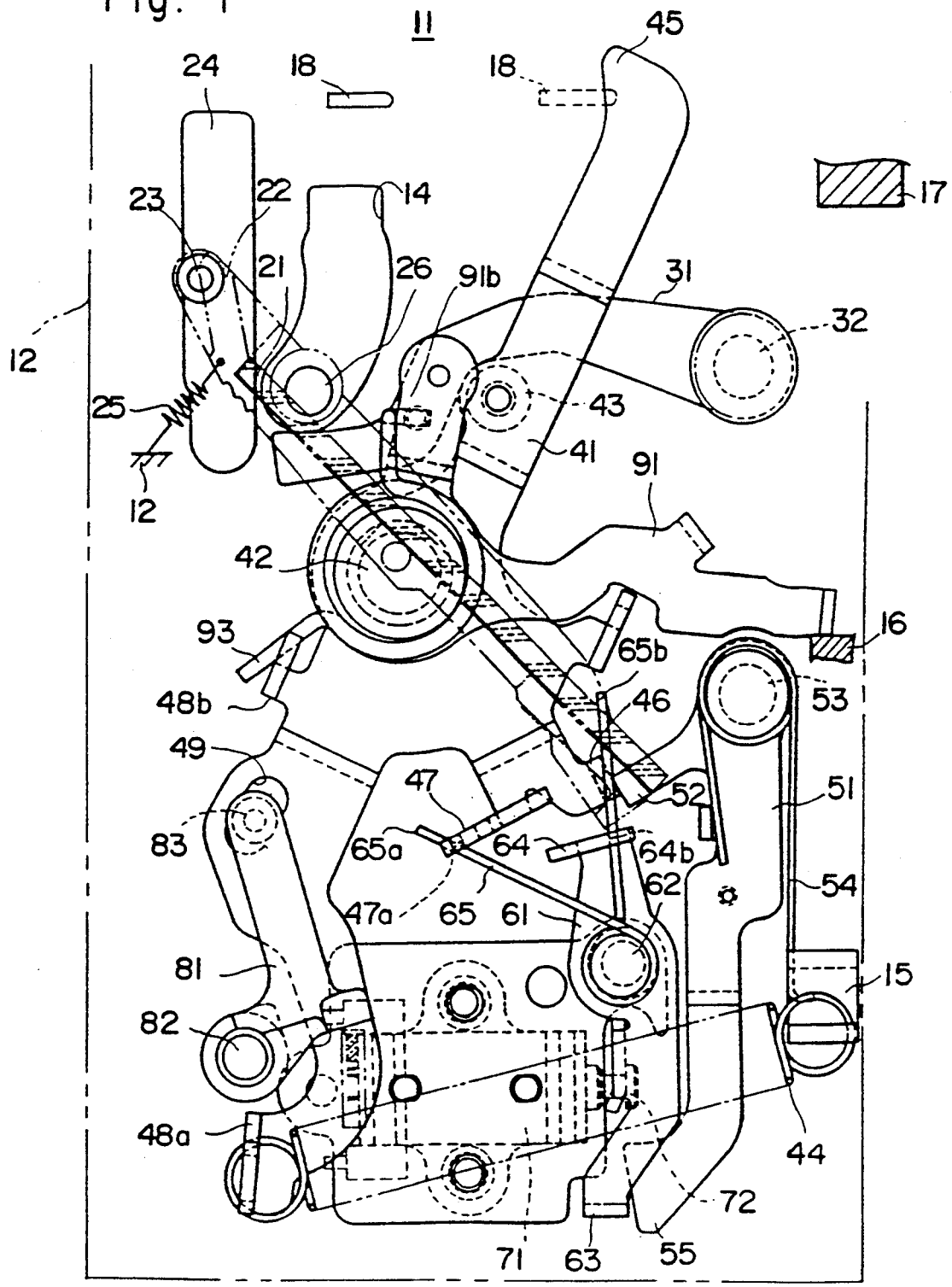
FIG. 1 is a side elevational view of a mirror box and its surroundings in a single lens reflex camera to which the present invention is applied, shown in a viewing position (i.e., mirror charge completion position, or downward position)
Figure 2:
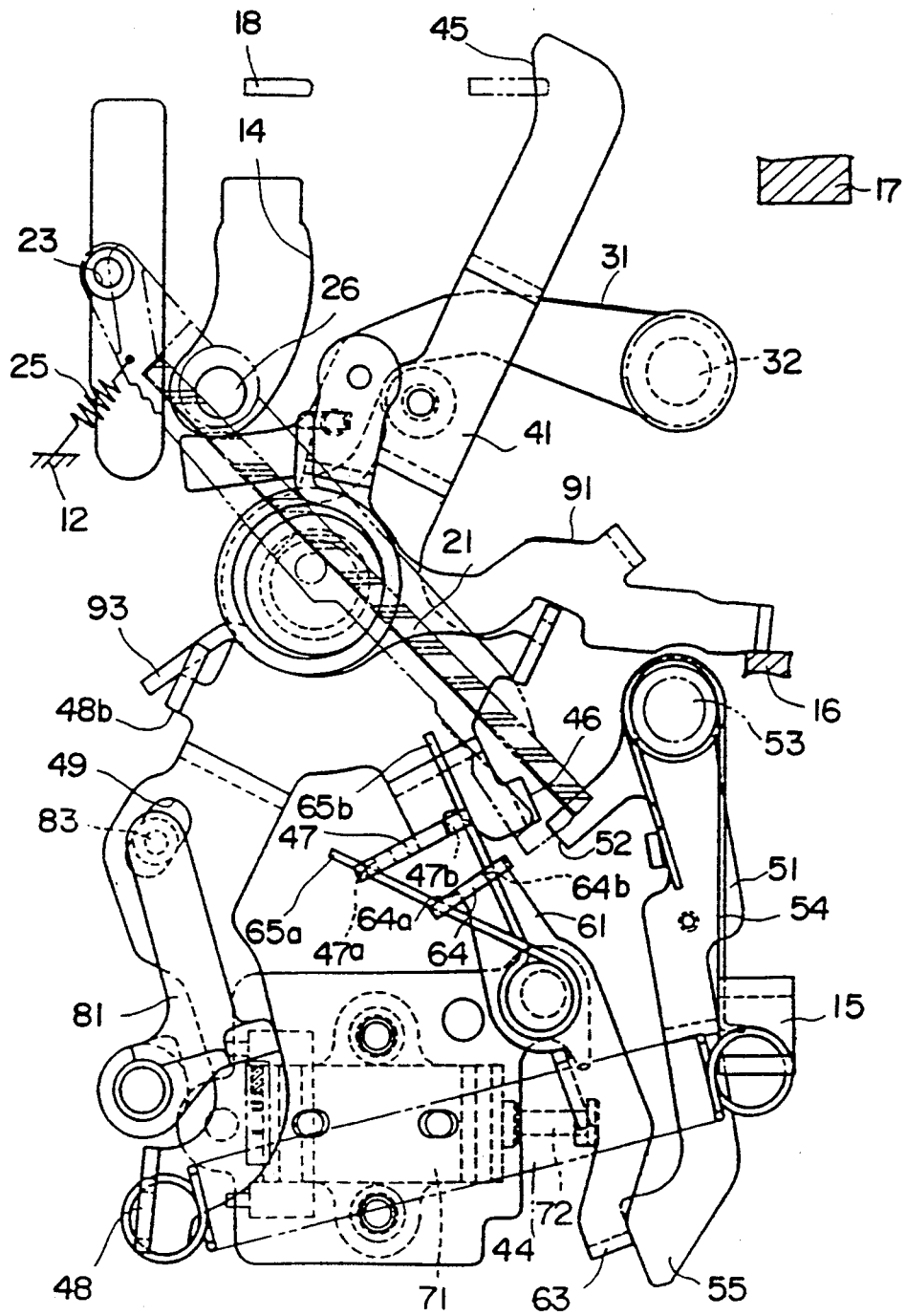
FIG. 2 is a side elevational view of a mirror box and its surroundings in a single lens reflex camera, shown in a position immediately after the releasing operation is effected; and, FIG. 3 is a side elevational view of a mirror box and its surroundings in a single lens reflex camera, shown in a position immediately before a photographic position (i.e., upward position).
Figure 3:
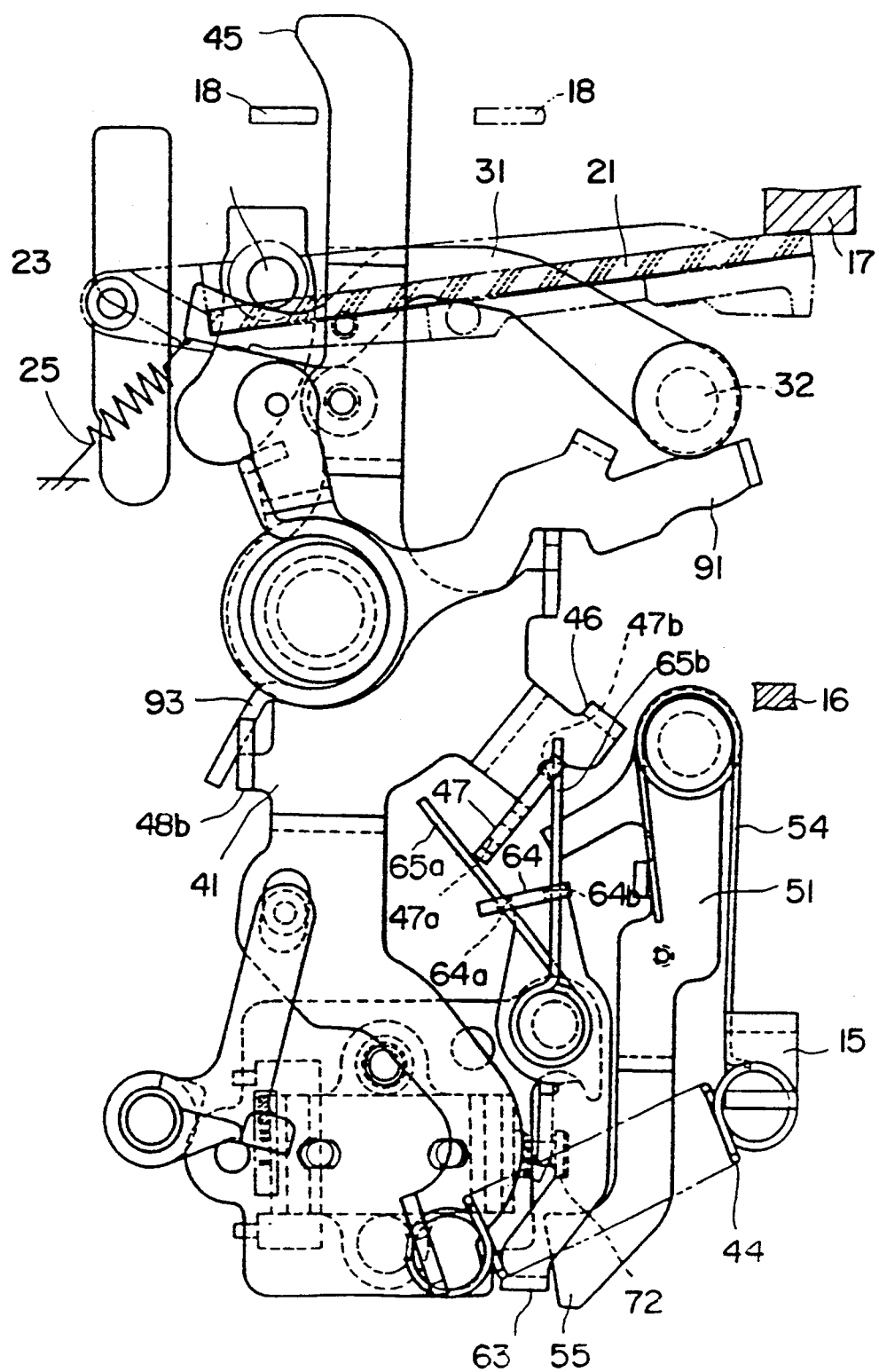

FIGS. 1 through 3 show a mirror driving apparatus in a single lens reflex camera according to an embodiment of the present invention. A main part of the mirror driving apparatus, according to the present invention, is unified in a mirror box.

A quick-return mirror 21 is housed in a mirror box 12 provided in a camera body 11. The mirror box 12 is provided with a bottom wall and a pair of upright side walls projecting from the bottom wall at opposite ends thereof. The upper, front, and rear faces of mirror box 12 are open. The mirror 21 is secured to a mirror sheet 22. The mirror sheet 22 is pivoted, with respect to the mirror box 12, at its upper end about a shaft 23 through a bearing 24. The mirror sheet 22 rotates about the shaft 23 to move the mirror 21 between a viewing position and a photographing position. The mirror sheet 22 is continuously biased toward the viewing position (i.e., downwardly) by a mirror returning spring 25 provided between the mirror box 12 and the mirror sheet 22. The mirror sheet 22 is provided on the side surface thereof with a mirror driving pin 26 which projects out of the mirror box 12 through a window 14 formed in the mirror box 12.

Mirror box 12 is provided on the outer side wall surface thereof with a mirror elevating lever 31 which is pivoted with respect to the mirror box 12 at a pivot shaft 32 so as to come into contact with the mirror driving pin 26. The mirror driving pin 26 and, accordingly, the mirror 21 and the mirror sheet 22, are moved to the photographic position against the force of mirror returning spring 25 by the rotation of the mirror elevating lever 31 in the upward direction (i.e., clockwise direction as shown in FIG. 1) to bring the mirror into the photographic position.

Mirror elevating lever 31 comes into contact with a mirror elevating collar 43 which is provided on a mirror driving lever 41 near the end thereof on the side opposite the mirror driving pin 26. The mirror driving lever 41 is rotatably supported at the intermediate portion thereof, on the outer surface of the mirror box 12, through a shaft 42. A mirror driving spring (mirror biasing means) 44 is provided between an abutment 48a provided on the other end of the mirror driving lever 41 and another abutment 15 provided on the mirror box 12 to continuously bias the mirror driving lever 41 in the mirror elevating direction (i.e., counterclockwise direction as shown in FIG. 1).

Mirror driving lever 41 has an arm portion 45 which comes into contact with a charging lever 18 provided in the camera body 11. The charging lever 18 is moved in a charging direction (i.e., right hand direction as shown in FIG. 1) by a charging device (not shown) upon winding a film, and is returned to the initial position after charging is completed. The mirror driving lever 41 is rotated in the charging direction, causing tension in the mirror driving spring 44. The rotation of lever 41 is done in association with the movement of the charging lever 18 in the charging direction, so that an abutment 46 of mirror driving lever 44 will engage an abutment 52 of an engaging lever 51 at the viewing position of the mirror 21 when the charging of the mirror is completed.

Engaging lever 51 is rotatably supported on the mirror box 12 through a shaft 53 and is biased to rotate in a direction in which the abutment 52 engages the abutment 46 of the mirror driving lever 41. The engaging lever 51 is biased by a return spring 54 which is provided around the shaft 53. The engaging lever 51 has an engaging arm portion 55 extending from the shaft 53 in a direction different from the abutment 52. The front end of the engaging arm portion 55 is in contact with a driving arm portion 63 of a mirror disengaging lever 61 to be rotated in the disengaging direction by the mirror disengaging lever 61.

Mirror disengaging lever 61 is provided between the mirror driving lever 41 and the engaging lever 51 to rotate about a shaft 62 on the mirror box 12. The mirror disengaging lever 61 is biased in a predetermined direction by a disengaging and shock absorbing spring 65 provided around the shaft 62.

Disengaging and shock absorbing spring 65 is a torsion type spring in which at a free end 65a thereof engages end 47a of an abutment 47 of the mirror driving lever 41 and free end 65b engages end 64b of an abutment 64 of mirror disengaging lever 61, to bias the mirror disengaging lever 61 in the disengaging direction, and biases the mirror driving lever 41 in a direction that moves the mirror to a raised position, when the mirror driving lever 41 is in the viewing position (FIG. 1).

On the other hand, when the mirror driving lever 41 is in the photographic position (FIG. 3), the free ends 65a and 65b of the disengaging and shock absorbing spring 65 act on the mirror driving lever 41 and the mirror disengaging lever 61 in the opposite direction. In particular, the free end 65a engages the other end 64a of the free end 64 of the mirror disengaging lever 61 and abutment 65b engages with the other end 47b of the abutment 47 of the mirror driving lever 41 to bias the mirror disengaging lever 61 and the mirror driving lever 41 toward the engaging position and the downward position of the mirror, respectively.

Mirror disengaging lever 61 is connected to a plunger 72 of an electromagnet (solenoid) 71 which is secured to the mirror box 12. The plunger 72 is normally retracted and attracted by a permanent magnet (not shown) to hold the mirror disengaging lever 61 in the engaging position. When the electromagnetic solenoid 71 is energized, the plunger 72 is projected due to the cancellation of magnetic force of the permanent magnet. That is, when the electromagnetic solenoid 71 is energized, the mirror disengaging lever 61 rotates in the disengaging direction and pulls the plunger 72 with the aid of elastic force of the disengaging and shock absorbing spring 65.

Mirror driving lever 41 is associated with a shutter mechanism disengaging lever 81 and a diaphragm operating lever 91. The shutter mechanism disengaging lever 81 is pivoted with respect to the mirror box 12 through a shaft 82, and is provided on one end thereof with an association pin 83. Association pin 83 is fitted in an elongated hole 49 formed in the mirror driving lever 41. The shutter mechanism disengaging lever 81 disengages the shutter mechanism (not shown) in association with the rotation of the mirror driving lever 41 to move the mirror upwardly, so that shutter curtains (leading and trailing curtains) can be moved by the electromagnetic control.

Diaphragm operating lever 91 is independently and rotatably supported by shaft 42 of the mirror driving lever 41 and is elastically connected to the mirror driving lever 41 through an association spring 93 provided around the shaft 42. In particular, the association spring 93, in a free state, engages at one end thereof an abutment 48b of the mirror driving lever 41 and at the other end engages an abutment 91b of the diaphragm operating lever 91. The diaphragm operating lever 91 bears against a stop 16 provided in the mirror box 12 when a taking lens is not mounted to the camera body in the mirror charging position. When a taking lens is mounted to the camera body, the diaphragm operating lever 91 is rotated to a diaphragm open position by a diaphragm releasing plate (not shown) provided on the taking lens. When the mirror driving lever 41 is rotated in the direction to move the mirror upward, the diaphragm operating lever 91 is rotated together therewith through the association spring 93 against the diaphragm releasing plate of the taking lens to reduce the diaphragm aperture.

The upward movement of the mirror is effected as follows.

When a release switch (not shown) is turned ON in the mirror charging position shown in FIG. 1, the electromagnetic solenoid 71 is energized and the mirror disengaging lever 61 is disengaged. Consequently, the mirror disengaging lever 61 is rotated in the disengaging direction (counterclockwise direction) by the spring force of the disengaging and shock absorbing spring 65.

Rotation of the mirror disengaging lever 61 in the counterclockwise direction causes the driving arm portion 63 to come into contact with the association arm portion 55 of the engaging lever 51 to rotate the latter in the disengaging direction against the engaging lever returning spring 54. Consequently, the abutment 52 is disengaged from the abutment 46 (FIG. 2). As a result of the disengagement, the mirror driving lever 41 is rotated in the mirror elevating direction by the restoring force of the mirror driving spring 44.

When the mirror driving lever 41 is rotated in the mirror elevating direction, the mirror elevating collar 43 comes into sliding contact with the mirror elevating lever 31 to rotate the same in the mirror elevating direction. The mirror elevating lever 31 is in sliding contact with the mirror driving pin 26 to rotate the mirror 21 and the mirror sheet 22 to the photographic position (upward direction) against the mirror returning spring 25. Consequently, the mirror 21 is moved upwardly until it comes into contact with the elastic stop 17 provided in the mirror box 12, at which point it is held in the photographic position (FIG. 3).

When the mirror driving lever 41 is rotated to elevate the mirror, the free end 65a of the disengaging and shock absorbing spring 65 is moved in a direction to release the elastic restoring force (i.e., in a direction to decrease the angle defined between the free ends 65a and 65b) in accordance with the movement of the abutment 47. During the rotation, the free ends 65a comes into contact with the end 64a of the abutment 64 of the mirror disengaging lever 61 to bias the mirror disengaging lever 61 in the engaging direction (clockwise direction). The other free end 65b comes into contact with the other end 47b of the abutment 47 and is rotated in the direction to spread the free ends 65a and 65b immediately before the rotation is completed.

The disengaging and shock absorbing spring 65 biases the mirror driving lever 41 in the elevational direction of the mirror when the mirror driving lever 41 is held in the viewing position. However, the biasing direction is reversed to bias the mirror driving lever 41 in the downward direction of the mirror at a position immediately before the photographic position.

Consequently, the mirror driving lever 41 is subject to an elastic biasing force in the downward direction, and rotates the mirror disengaging lever 61 in the return direction through the disengaging and shock absorbing spring 65, immediately before the upward movement of the mirror is completed. Thus, the shock and oscillation of the mirror driving lever 41 which occur at the stoppage thereof can be reduced or damped.

Upon completion of the upward movement of the mirror 21, the latter is held in the photographic position by the restoring spring force of the mirror driving spring 44 through the mirror driving lever 41 and the mirror elevating lever 31.

Mirror disengaging lever 61 pushes the plunger 72 by the restoring force of the disengaging and shock absorbing spring 65 in the engaging direction, so that the plunger 72 is attracted by the permanent magnet to be held in the engaging position, whereby the engaging lever 51 is rotated by the restoring force of the engaging lever returning spring 54 to be held in the engaging position.

If movement of the shutter curtains ends when the upward movement of the mirror is completed, charging lever 18 is driven in the charging direction by the charging device (not shown) to rotate the mirror driving lever 41 in the direction corresponding to downward movement of the mirror, the mirror 21 is moved downward (in the clockwise direction) toward the viewing position by the restoring force of the mirror returning spring 25. During the rotation of the mirror driving lever 41 in the downward direction, the shoulder portion of the abutment 46 comes into sliding contact with the upper edge of the abutment 52 to rotate the engaging lever 51 in the disengaging direction against the biasing force of the engaging lever returning spring 54.

Upon completion of charging, abutment 46 is disengaged from the upper edge of the abutment 52, so that the engaging lever 51 is rotated in the engaging direction to bring the abutment 46 into contact with the abutment 52. Thus, the mirror driving lever 41 is returned to and held in the charging position shown in FIG. 1.

As can be seen from the above discussion, according to the present invention, since the abutment 65b of the disengaging and shock absorbing spring 65 for biasing the mirror disengaging lever 61, which disengages the engagement of the mirror driving lever 41, comes into contact with the abutment 47 when the mirror driving lever 41 approaches the elevated position to brake the mirror driving lever 41, the latter and, accordingly, mirror 21, are suddenly decelerated by the elastic biasing force of the disengaging and shock absorbing spring 65, so that the shock and oscillation occurring at the stopping position of the mirror can be damped.

As can be understood from the foregoing, according to the present invention, since the disengaging and shock absorbing means for elastically biasing the abutment means, which engages the mirror biasing member with an elastic restoring force, acts on the mirror to bias the same in the downward direction during the upward movement of the mirror immediately before the upward movement is completed, the shock and oscillation of the mirror which occurs when the mirror comes to a stop is prevented.

I claim:

1. A mirror driving apparatus for a camera which drives a mirror, the mirror being rotatably movable between two predetermined positions, by an elastic restoring force stored in a mirror biasing member, said mirror driving apparatus comprising:
    an engaging means for retaining the elastic restoring force in the mirror biasing member; and
    a disengaging and shock absorbing means for elastically biasing the engaging means in a disengaging direction thereof when the mirror is in one of the predetermined positions, and for biasing the mirror in a direction to stop the mirror immediately before the movement of the mirror is completed when the mirror is moved to the other of the predetermined positions by the elastic restoring force of the mirror biasing member.

2. A mirror driving apparatus according to claim 1, wherein said camera is a single lens reflex camera having a mirror box.

3. A mirror driving apparatus according to claim 2, further comprising a mirror sheet which is pivoted at one end thereof with respect to the mirror box to rotate between the two predetermined positions, said mirror being secured to the mirror sheet.

4. A mirror driving apparatus according to claim 3, wherein said two predetermined positions are a viewing position and a photographing position, respectively.

5. A mirror driving apparatus according to claim 4, further comprising a mirror returning spring which biases the mirror with a force smaller than said elastic restoring force of the mirror biasing member toward the viewing position.

6. A mirror driving apparatus according to claim 5, further comprising a mirror driving lever associated with the mirror, such that the mirror biasing member moves the mirror from the viewing position to the photographic position through the mirror driving lever.

7. A mirror driving apparatus according to claim 6, wherein said engaging means comprises a mirror engaging lever which engages the mirror driving lever in the viewing position, and a mirror disengaging lever which drives the mirror engaging lever in a disengaging direction.

8. A mirror driving apparatus according to claim 7, wherein said disengaging and shock absorbing means comprises a disengaging and shock absorbing spring which biases the disengaging lever in an engaging direction when the mirror driving lever is in the viewing position.

9. A mirror driving apparatus according to claim 8, wherein said mirror engaging lever comprises an engaging lever returning spring which biases the disengaging lever in the engaging direction with a force smaller than a spring force of the disengaging and shock absorbing spring.

10. A mirror driving apparatus according to claim 9, wherein said biasing and shock absorbing spring is a torsion spring which bears at one end thereof against one end of an abutment provided on the mirror driving lever and at the other end thereof against one end of an abutment provided on the disengaging lever when the mirror driving lever is in the viewing position, respectively.

11. A mirror driving apparatus according to claim 10, wherein said biasing and shock absorbing spring biases the mirror driving lever and the disengaging lever toward the viewing position and in the disengaging direction when the mirror driving lever is in the viewing position, respectively.

12. A mirror driving apparatus according to claim 9, wherein said biasing and shock absorbing spring comes into contact at one end thereof with said one end of the abutment of the disengaging lever, and at the other end thereof comes into contact with said one end of the abutment of the mirror driving lever to bias the mirror driving lever in the viewing position, when the mirror driving lever in approaches an elevated position of the mirror.

13. A mirror driving apparatus according to claim 12, wherein said biasing and shock absorbing spring biases the disengaging lever in the engaging direction when the mirror driving lever is in a position which bring the mirror into the elevated position.

14. A mirror driving apparatus according to claim 8, further comprising an electromagnetic solenoid having a plunger which holds the disengaging lever in the engaging position thereof, so that the plunger releases the holding operation when the solenoid is energized.

15. A mirror driving apparatus according to claim 14, wherein when said electromagnetic solenoid is energized, the disengaging lever rotates the mirror engaging lever in the disengaging direction thereof with the help of the elastic biasing force of the biasing and shock absorbing spring.

* * * * *

UNITED STATES PATENT AND TRADEMARK OFFICE
CERTIFICATE OF CORRECTION

PATENT NO. : 5,294,952
DATED : March 15, 1994
INVENTOR(S) : M. MISAWA

It is certified that error appears in the above-indentified patent and that said Letters Patent is hereby corrected as shown below:

On the cover, in section [57], "ABSTRACT", line 3, change "position" to ---positions---.

On the cover, in section [57], "ABSTRACT", line 9, change "position" to ---positions---.

On the cover, in section [57], "ABSTRACT", line 13, change "position" to ---positions---.

At column 8, line 6 (claim 12, line 8), delete "in".

At column 8, line 11 (claim 13, line 4), change "bring" to ---brings---.

Signed and Sealed this

Third Day of December, 1996

Attest:

BRUCE LEHMAN

*Attesting Officer*   *Commissioner of Patents and Trademarks*